United States Patent [19]

Cummins et al.

[11] 4,179,647

[45] Dec. 18, 1979

[54] DUAL OUTPUT BATTERY CHARGING SYSTEM

[75] Inventors: Donald L. Cummins; Daniel W. Stahura, both of Anderson, Ind.

[73] Assignee: General Motors Corporation, Detroit, Mich.

[21] Appl. No.: 856,642

[22] Filed: Dec. 2, 1977

[51] Int. Cl.$^2$ .............................................. H02J 7/14
[52] U.S. Cl. ........................................ 320/6; 320/17; 322/25; 322/90
[58] Field of Search ............... 322/28, 90, 25; 320/64, 320/68, 15, 17, 6, 39, 32

[56] References Cited

U.S. PATENT DOCUMENTS

| | | |
|---|---|---|
| 3,624,480 | 11/1971 | Campbell et al. |
| 3,667,025 | 5/1972 | Campbell et al. |
| 3,670,229 | 6/1972 | Harris .............................. 322/28 X |
| 3,671,843 | 6/1972 | Huntzinger et al. |
| 3,710,226 | 1/1973 | Seike . |
| 3,816,805 | 6/1974 | Terry . |
| 3,992,592 | 11/1975 | Quantz . |
| 4,047,088 | 9/1977 | Himmler . |

Primary Examiner—Robert J. Hickey
Attorney, Agent, or Firm—Richard G. Stahr

[57] ABSTRACT

The alternating current output potential of an alternator is rectified by a main rectifier circuit to provide a first charging potential and by an auxiliary rectifier circuit arrangement of the type that is enabled only in response to the presence of electrical enabling signals to provide a second charging potential. The first charging potential is applied across two series connected storage batteries and the second charging potential is applied across only a selected one of batteries. The enabling signals for the auxiliary rectifier circuit arrangement are initiated by a free-running oscillator circuit and circuitry responsive to the potential across the two batteries in series and to the potential across the selected battery is arranged to disable the oscillator circuit when the potential across the selected battery is of magnitude greater than one-half that of the potential across the two series connected batteries.

4 Claims, 1 Drawing Figure

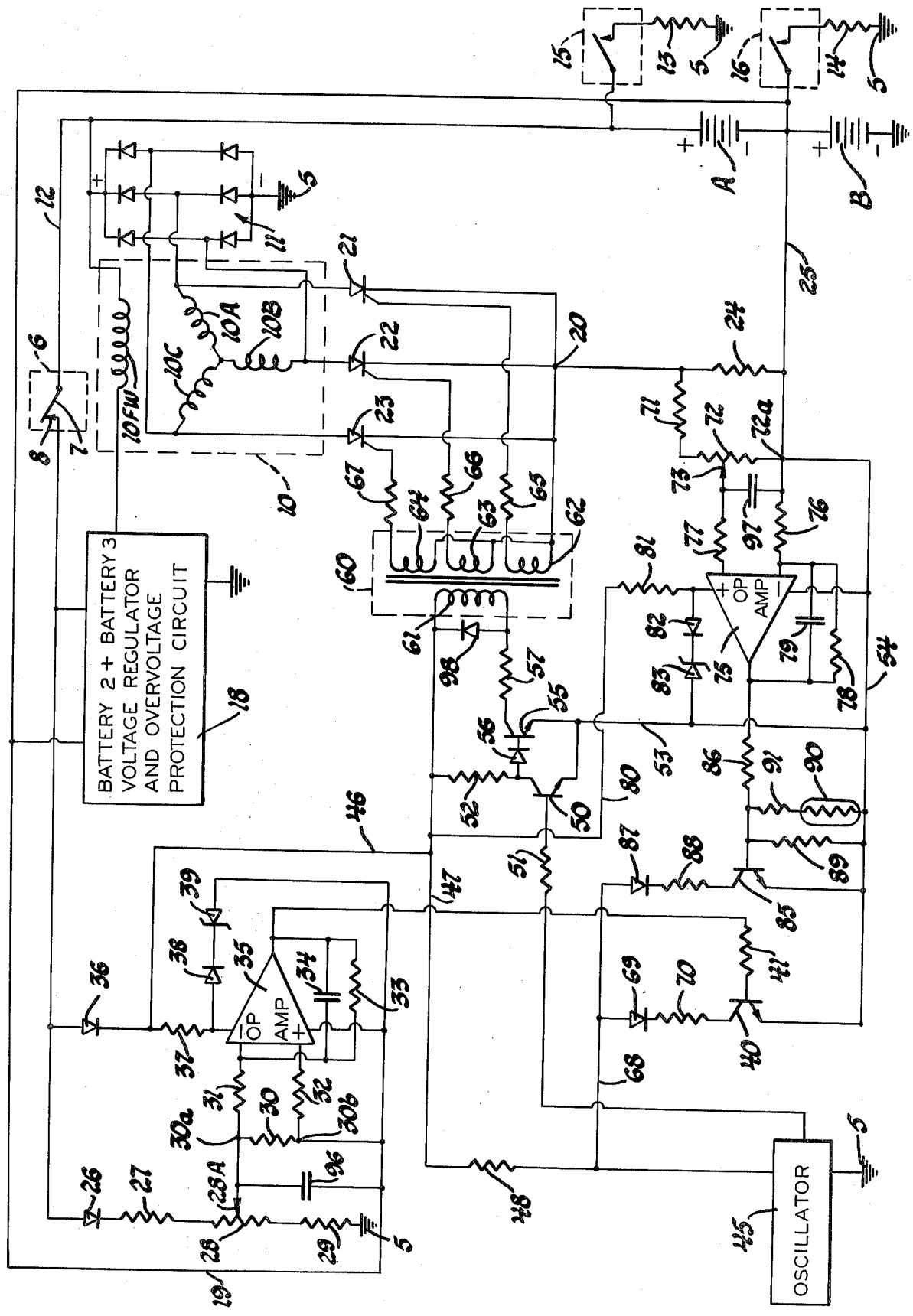

DUAL OUTPUT BATTERY CHARGING SYSTEM

This invention is directed to a battery charging system and, more specifically, to a battery charging system of the type capable of supplying two discrete battery charging potentials.

With most modern motor vehicles, the alternating current output potential of an alternator driven by the motor vehicle engine is full-wave rectified to provide a direct current system operating potential that is generally employed as a storage battery charging potential and as a vehicle electrical accessory supply potential.

With some motor vehicle applications, such as heavy duty trucks and buses, self-propelled earth-moving equipment and recreational vehicles and the like, it has been found to be desirable to provide two discrete operating potentials of different potential levels. To provide sufficient electrical energy to crank the engine employed with applications of this type, it has been found desirable to connect two automotive type storage batteries in series and to energize the engine cranking motor by the potential appearing across the two series connected batteries. In general, the motor vehicle accessory loads such as lighting and radios are connected across only one of the batteries as these accessories generally require a lower operating potential than that provided by the two batteries in series.

One known arrangement in the motor vehicle art for charging two series connected storage batteries is to regulate the vehicle battery charging system to supply one charging potential of a sufficient magnitude to charge the batteries in series. With systems of this type, it is difficult to equalize the loads on the two batteries, consequently, battery overcharging or battery undercharging may occur.

One solution to this problem is described in U.S. Pat. No. 3,667,025, Campbell et al, that issued May 30, 1972 and is assigned to the same assignee as is this invention. In this patent, two 12-volt storage batteries are charged in series by a 24-volt charging system. The voltage at the junction between the two series connected batteries is compared with a reference voltage by a voltage regulator circuit that is operative to activate a DC to DC converter circuit that provides a charging potential for one of the batteries when the output potential of this battery drops below a predetermined value. Another solution to this problem is described in U.S. Pat. No. 3,624,480, Campbell et al, that issued Nov. 30, 1971 and is assigned to the same assignee as is this invention. This patent describes a dual charging potential system in which two series connected batteries are charged by the output potential of a diode bridge rectifier circuit that is supplied by an alternator and includes the parallel combination of a silicon controlled rectifier connected across each of the alternator phase windings and the junction between the two series connected batteries. The output potential across one of the batteries is continuously monitored and, when this potential falls to a magnitude at which additional charge is required, the parallel silicon controlled rectifiers are triggered conductive to supply an auxiliary charging potential to this battery. Another solution to this problem is described in U.S. Pat. No. 4,047,088 Himmler, that issued Sept. 6, 1977 and is assigned to the same assignee as is this application. This patent describes a dual charging potential system in which two series connected batteries are charged by the output potential of a diode bridge rectifier circuit that is supplied by an alternator. The output potential across one of the batteries is continuously monitored and, when this potential falls to a magnitude at which additional charge is required, a single silicon controlled rectifier connected across one of the phase windings of the alternator and the junction between the two series connected batteries is triggered conductive to supply an auxiliary charging potential to this battery.

The present invention represents an improvement over the battery charging systems described in the above-mentioned patents wherein an auxiliary fullwave rectifier circuit arrangement is enabled to provide an auxiliary charging potential to a selected one of two series connected batteries when the potential across the selected one battery falls to a level at which an additional charge is indicated and also includes circuitry in the auxiliary charging circuit that is sensitive to charging current supplied thereby to disable the auxiliary charging circuit when the charging current increases to a predetermined level.

It is an object of this invention to provide an improved storage battery charging system.

It is another object of this invention to provide an improved storage battery charging system that is capable of supplying two battery charging potentials.

It is another object of this invention to provide an improved storage battery charging system that supplies a charging potential for two series connected storage batteries and, when the potential across a selected one of the batteries decreases to a predetermined magnitude, provides a second charging potential for the selected battery.

It is an additional object of this invention to provide an improved storage battery charging system that supplies a charging potential for two series connected storage batteries and includes an auxiliary charging circuit that, when the potential across a selected one of the batteries decreases to a predetermined magnitude, provides a second charging potential for the selected battery and, further, includes a current sensing arrangement in the auxiliary charging circuit that is effective to disable the auxiliary charging circuit when the charging current supplied thereby increases to a predetermined level.

In accordance with this invention, a dual output battery charging system for supplying two direct current charging potentials is provided wherein the alternating current output potential of an alternator is rectified by a main rectifier circuit to provide a first charging potential that is applied across two series connected storage batteries and by an auxiliary rectifier circuit arrangement to provide a second charging potential that is applied across only a selected one of the batteries when the potential across the selected battery is of a magnitude less than one-half that of the potential magnitude across the two series connected batteries.

For a better understanding of the present invention, together with additional objects, advantages, and features thereof, reference is made to the following description and accompanying single FIGURE drawing.

As point of reference or ground potential is the same point electrically throughout the system, it is represented in the drawing by the accepted schematic symbol and is referenced by the numeral 5.

In the circuit of FIGURE 1, two operational amplifier circuits are employed. These operational amplifier circuits may be any of the many commercially available integrated circuit operational amplifier circuits or of any other type operational amplifier arrangement having similar electrical characteristics. In an actual embodiment, commercially available operational amplifier circuits marketed by the National Semiconductor Corporation under the designation LM2904N are employed.

Referring to the drawing, an alternating current potential is produced by a conventional alternator 10 having three Y-connected output windings 10A, 10B and 10C and a field winding 10FW. As is well known in the automotive art, the rotor, not shown, of alternator 10 is driven by the vehicle engine, also not shown. The output windings of alternator 10 are connected to the respective alternating current input terminals of a conventional main three-phase full wave diode bridge type rectifier circuit 11 in a manner well known in the art. The positive polarity direct current output terminal of main rectifier circuit 11 is connected to positive polarity potential lead 12 and the negative polarity output terminal thereof is connected to point of reference or ground potential 5. Conventional automotive type storage batteries A and B of an equal potential rating are connected in series across the positive and negative polarity output terminals of rectifier circuit 11 through positive polarity potential lead 12 and through point of reference or ground potential 5. Main rectifier circuit 11, therefore, rectifies the alternating current output potential of alternator 10 to a first direct current charging potential that is applied across the two series connected batteries A and B. A single pole-single throw switching arrangement must be included in positive polarity potential lead 12 as represented in the drawing by a single pole-single throw switch 6 having a movable contact 7 and a stationary contact 8. Contacts 7 and 8 may be the normally open ignition circuit contacts of a conventional automotive type ignition switch well known in the art. With movable contact 7 electrically closed to stationary contact 8, as shown in the drawing, operating potential of a magnitude equal to the sum of the output potentials of batters A and B appears across positive polarity potential lead 12 and point of reference or ground potential 5. With the arrangement shown in the drawing, external electrical loads requiring an energizing potential magnitude equal to the sum of the potentials of series connected batteries A and B and external electrical loads requiring energizing potentials of a level equal to the output potential of only battery B may be supplied. For purposes of illustration, those external electrical loads to be energized by the sum of the potentials of batteries A and B are represented by a single resistor 13 and those external electrical loads to be energized by the output potential of battery B are represented by resistor 14. These loads may be energized by electrically closing respective single pole-single throw switches 15 and 16. Examples of external electrical loads requiring the sum of the output potentials of batteries A and B are direct current engine cranking motors and blower motors and examples of external electrical loads requiring the output potential of battery B are headlamps and radio communication equipment.

The output potential of main rectifier circuit 11 is regulated to a direct current potential magnitude consistent with that required to supply charging current to series connected batteries A and B. For example, should batteries A and B be of the 12-volt DC type, the output charging potential of main rectifier circuit 11 is regulated to approximately 27.5 volts DC. In the actual embodiment, a voltage regulator and overvoltage protection circuit 18 is employed to regulate the output charging potential of main rectifier circuit 11 to a direct current charging potential magnitude consistent with that required to supply charging current to the series connected batteries employed. This voltage regulator and overvoltage protection circuitry is represented in the drawing in block form as it may be of the type disclosed and described in detail in U.S. Pat. No. 3,938,005, Cummins, that issued Feb. 10, 1976 and is assigned to the same assignee as is this invention.

To rectify the alternating current output potential of alternator 10 to a second direct current charging potential, three silicon controlled rectifiers 21, 22 and 23 are employed. The anode electrode of each of silicon controlled rectifiers 21, 22 and 23 is connected to the output terminal end of a respective alternator 10 output winding 10A, 10B and 10C and the cathode electrodes thereof are connected to common junction point 20. Consequently, while any of silicon controlled rectifiers 21, 22 and 23 are triggered conductive, a second charging potential appears across junction 20 and point of reference or ground potential 5 and is applied through resistor 24 and lead 25 across battery B. Silicon controlled rectifiers 21, 22 and 23 in conjunction with the negative polarity bank of diodes of main rectifier circuit 11 comprise an auxiliary rectifier circuit arrangement which, since one or more of silicon controlled rectifier 21, 22 and 23 must be triggered conductive to produce a second charging potential across junction 20 and point of reference or ground potential 5, is of the type that is enabled only in response to electrical enabling signals applied as trigger signals across the gate-cathode electrodes of these silicon controlled rectifiers.

The sum of the output potentials of batteries A and B is applied through a diode 26 across the series combination of a resistor 27, a potentiometer 28 and a resistor 29. The movable contact 28A of potentiometer 28 is adjusted to the point at which the potential across resistor 30, connected across movable contact 28A and the positive polarity output terminal of battery B through lead 19 is equal to one-half the sum of the output potentials of batteries A and B. Terminal end 30a of resistor 30 is connected to the inverting input terminal of operational amplifier circuit 35 through input resistor 31 and terminal end 30b of resistor 30 is connected to the non-inverting input terminal of operational amplifier circuit 35 through input resistor 32. With a feedback resistor 33 connected between the output terminal of operational amplifier circuit 35 and the inverting input terminal thereof, this device functions as a non-inverting direct current amplifier circuit. Capacitor 34 is inserted in parallel with feedback resistor 33 for the purpose of stabilizing the circuit. In the actual embodiment, feedback resistor 33 has a resistance value of 1.5 megohms and input resistor 31 has a resistance value of 10 kilohms. Consequently, this amplifier circuit has a gain of 151. Operating potential is supplied to operational amplifier 35 through diode 36 and resistor 37. The combination of diode 38 and Zener diode 39 clamps the voltage across operational amplifier circuit 35 to a safe level, for example, 8 volts DC.

Assuming that the potential of battery B is less than one-half the sum of the potentials of batteries A and B, the resulting current flow from terminal end 30a toward terminal end 30b of resistor 30 produces a potential drop thereacross of a positive polarity upon terminal end 30a with respect to terminal end 30b. In response to an input signal of this polarity, operational amplifier circuit 35 produces a substantially zero output signal which is applied to the base electrode of NPN transistor 40 through base resistor 41. As this signal is incapable of providing base-emitter drive current to an NPN transistor, NPN transistor 40 is not conductive through the collector-emitter electrodes thereof. With transistor 40 not conducting, operating potential is supplied to a free-running oscillator circuit 45 through diode 36, leads 46 and 47 and resistor 48. Consequently, oscillator circuit 45 produces a series of electrical output signals which are applied to the base electrode of NPN transistor 50 through base resistor 51. As oscillator circuit 45 may be any of the many oscillator circuits well known in the art it is illustrated in the drawing in block form. In the actual embodiment, a commercially available timer circuit marketed by Motorola Semiconductor Products, Inc. under the designation MC1455 is employed for this application. This device is interconnected in a manner well known in the art to provide a free-running oscillator circuit having an output frequency of approximately 4.3 kilohertz. As a positive polarity operating potential is applied across the collector-emitter electrodes of NPN transistor 50 through diode 36, leads 46 and 47 and collector resistor 52 and through leads 53, 54 and 25, this device is triggered conductive through the collector-emitter electrodes during each positive polarity excursion of the output signals of oscillator circuit 45 and not conductive during each negative polarity excursion of the output signals of oscillator circuit 45. While NPN transistor 50 is not conductive through the collector-emitter electrodes, base-emitter drive current is supplied to NPN transistor 55 through diode 36, leads 46 and 47, collector resistor 52 and diode 56. This base emitter drive current triggers NPN transistor 55 conductive through the collector-emitter electrodes to complete an energizing circuit for primary winding 61 of a pulse transformer 60 which may be traced from the positive polarity output terminal of battery A, through positive polarity potential lead 12, the closed contacts of switch 6, diode 36, leads 46 and 47, primary winding 61, collector resistor 57, the collector-emitter electrodes of NPN transistor 55 and leads 53, 54 and 25 to the negative polarity output terminal of battery A. Each of secondary windings 62, 63 and 64 of pulse transformer 60 is connected across the gate-cathode electrode of a respective one of silicon controlled rectifiers 21, 22 and 23 through respective current limiting resistors 65, 66 and 67. Consequently, each time NPN transistor 55 conducts through the collector-emitter electrodes to complete the previously described energizing circuit for primary winding 61, an auxiliary rectifier circuit arrangement enabling signal pulse is induced in each of secondary windings 62, 63 and 64. In response to these enabling signal pulses, the silicon controlled rectifiers 21, 22 or 23 which have a positive potential applied to the anode electrodes thereof are triggered conductive through the anode-cathode electrodes to produce the second charging potential across junction 20 and point of reference or groung potential 5. This second charging potential is applied to battery B through circuitry previously described. The silicon controlled rectifiers 21, 22 and 23, therefore, are supplied with enabling signals at a frequency equal to that of the output signal frequency of oscillator circuit 45.

When the potential of battery B has increased to a value greater than one-half the sum of the potentials of batteries A and B, the resulting current flow through resistor 30 produces a potential drop thereacross of a positive polarity upon terminal end 30b thereof with respect to terminal end 30a. In response to this signal, operational amplifier circuit 35 produces a positive polarity output direct current signal that supplies base-emitter drive current to NPN transistor 40. As operating potential is applied across the collector-emitter electrodes of NPN transistor 40 through diode 36, leads 46 and 47, resistor 48, lead 68, diode 69 and resistor 70 and through leads 54 and 25, this device is triggered conductive through the collector-emitter electrodes thereof. Upon the conduction of NPN transistor 40 through the collector-emitter electrodes thereof, operating potential is shunted therethrough from oscillator circuit 45 to disable oscillator circuit 45. With oscillator circuit 45 disabled, the enabling signals are no longer supplied to silicon controlled rectifiers 21, 22 and 23, consequently, the second charging potential is removed from junction 20.

From this description, it is apparent that the combination of oscillator circuit 45, NPN transistors 50 and 55 and pulse transformer 60 produce a series of electrical enabling signals which are applied to the gate-cathode electrodes of each of silicon controlled rectifiers 21, 22 and 23 of the auxiliary rectifier circuit arrangement. Further, operational amplifier 35 and the associated circuitry previously described is responsive to the potential across the two series connected batteries and to the potential across the selected one of the batteries for disabling oscillator circuit 45 when the potential across the selected one of the batteries is of a magnitude greater than one-half that of the potential across the two series connected batteries. Consequently, the auxiliary rectifier circuit arrangement is disabled while the potential across the selected one battery B is of a magnitude greater than one-half that of the potential across the two series connected batteries A and B.

To disable the auxiliary rectifier circuit arrangement when the output current thereof is greater than a predetermined maximum value, the series combination of a resistor 71 and a potentiometer 72 is connected across current sensing resistor 24. The potential drop across movable contact 73 of potentiometer 72 and terminal end 72a thereof is applied through respective input resistors 76 and 77 to the inverting and non-inverting input terminals of an operational amplifier circuit 75. With feedback resistor 78 connected between the output terminal of operational amplifier 75 and the inverting input terminal thereof, this device operates as a non-inverting direct current amplifier circuit. In the actual embodiment, feedback resistor 78 has a resistance value of 1.5 megohms and input resistor 77 has a resistance value of 10 kilohms, consequently, this circuit provides a gain of 151. Capacitor 79 is connected in parallel across feedback resistor 78 to provide circuit stabilization. Potentiometer 72 is employed to adjust the input signal to operational amplifier circuit 75 to a desired value. Operating potential is supplied to operational amplifier 75 through lead 80 and resistor 81 and the series combination of diode 82 and Zener diode 83 clamps the voltage across operational amplifier 75 to a safe value, for example 8 volts DC. Movable contact 73 of potentiometer 72 is adjusted to the point at which, with the predetermined maximum charging current flowing through current sensing resistor 24, the potential across movable contact 73 and terminal end 72a of potentiometer 72 is of a magnitude equal to the trip point voltage of operational amplifier circuit 75. With a potential of this magnitude applied across the input terminals thereof, operational amplifier circuit 75 produces an output signal of a positive polarity with respect to lead 54 that is applied to the base electrode of NPN transistor 85 through base resistor 86. This potential supplies base-emitter drive current for NPN transistor 85 to trigger this device conductive through collector-emitter electrodes. Upon the conduction of NPN transistor 85, operating potential is shunted therethrough from oscillating circuit 45 through diode 87 and collector resistor 88 to disable oscillator circuit 45. With oscillator circuit 45 disabled, the circuitry for producing the series of electrical enabling signals for the auxiliary rectifier circuit arrangement is disabled in response to the charging current from the auxiliary rectifier circuit arrangement increasing to a predetermined maximum value.

The combination of resistor 89 connected in parallel with the series combination of resistor 91 and thermistor 90 provides temperature compensation for NPN transistor 85. As the ambient temperature increases, it is desirable to reduce the average charging current produced by the auxiliary rectifier circuit arrangement. Consequently, as the ambient temperature increases, the circuitry that produces the electrical enabling signals for the auxiliary rectifier circuit arrangement should be disabled more frequently. This temperature compensating arrangement is so scaled relative to the base-emitter voltage of NPN transistor 85 at different ambient temperatures that the turn-on point of NPN transistor 85 follows a predetermined temperature compensation curve which will limit the auxiliary rectifier circuit arrangement average charging current to a predetermined value as determined by the ambient temperature. For example, in the actual embodiment, the average auxiliary rectifier circuit arrangement charging current is limited within a range of 75 amperes to 50 amperes as the ambient temperature increases.

Capacitors 96 and 97 are filter or de-spiking capacitors which are inserted for the purpose of smoothing circuit operation and diode 98 is the well known "free-wheeling" diode connected across primary winding 61.

While a preferred embodiment of the present invention has been shown and described, it will be obvious to those skilled in the art, that various modifications and substitutions may be made without departing from the spirit of the invention which is to be limited only within the scope of the appended claims.

It is claimed:

1. A dual output battery charging system for supplying direct current charging potentials for two series connected storage batteries comprising:
   means for producing an alternating current potential;
   first circuit means for rectifying said alternating current potential to a first direct current charging potential and for applying said first charging potential across said two series connected batteries;
   second circuit means for rectifying said alternating current potential to a second direct current charging potential and for applying said second charging potential across a selected one of said batteries, said second circuit means being of the type that is enabled only in response to electrical enabling signals;
   an oscillator circuit for producing a series of electrical signals and for applying said signals as enabling signals to said second circuit means; and
   means responsive to the output current of said second circuit means for disabling said oscillator circuit when said output current is greater than a predetermined maximum value whereby said second circuit means is disabled when said output current thereof is greater than said predetermined maximum value.

2. A dual output battery charging system for supplying direct current charging potentials for two series connected storage batteries comprising:
   means for producing an alternating current potential;
   first circuit means for rectifying said alternating current potential to a first direct current charging potential and for applying said first charging potential across said two series connected batteries;
   second circuit means for rectifying said alternating current potential to a second direct current charging potential and for applying said second charging potential across a selected one of said batteries;
   said second circuit means being of the type that is enabled only in response to electrical enabling signals;
   an oscillator circuit for producing a series of electrical signals;
   a transformer for applying said series of electrical signals as enabling signals to said second circuit means;
   means responsive to the potential across said two series connected batteries and to the potential across said selected one of said batteries for disabling said oscillator circuit when the potential across said selected one of said batteries is of a magnitude greater than one-half that of the potential across said two series connected batteries whereby said second circuit means is disabled while the potential across said selected one of said batteries is of a magnitude greater than one-half that of the potential across said two series connected batteries.

3. A dual output battery charging system for supplying direct current charging potentials for two series connected storage batteries comprising:
   means for producing an alternating current potential;
   first circuit means for rectifying said alternating current potential to a first direct current charging potential and for applying said first charging potential across said two series connected batteries;
   second circuit means for rectifying said alternating current potential to a second direct current charging potential and for applying said second charging potential across a selected one of said batteries, said second circuit means being of the type that is enabled only in response to electrical enabling signals;
   an oscillator circuit for producing a series of electrical signals and for applying said signals as enabling signals to said second circuit means;
   means responsive to the potential across said two series connected batteries and to the potential across said selected one of said batteries for disabling said oscillator circuit when the potential across said selected one of said batteries is of a magnitude greater than one-half that of the potential across said two series connected batteries whereby said second circuit means is disabled the potential across said selected one of said batteries is of a magnitude greater than one-half that of the potential across said two series connected batteries; and
   means responsive to the output current of said second circuit means for disabling said oscillator circuit when said output current is greater than a predetermined maximum value whereby said second circuit means is also disabled when said output current thereof is greater than said predetermined maximum value.

4. A dual output battery charging system for supplying direct current charging potentials for two series connected storage batteries comprising:

means for producing an alternating current potential;

first circuit means for rectifying said alternating current potential to a first direct current charging potential and for applying said first charging potential across said two series connected batteries;

second circuit means for rectifying said alternating current potential to a second direct current charging potential and for applying said second charging potential across a selected one of said batteries, said second circuit means being of the type that is enabled only in response to electrical enabling signals;

an oscillator circuit for producing a series of electrical signals and for applying said signals as enabling signals to said second circuit means;

means responsive to the potential across said two series connected batteries and to the potential across said selected one of said batteries for producing a first electrical output signal when the potential across said selected one of said batteries is of a magnitude higher than one-half that of the potential across said two series connected batteries;

first means responsive to said first electrical output signal for disabling said oscillator circuit whereby said second circuit means is disabled while the potential across said selected one of said batteries is of a magnitude greater than one-half that of the potential across said two series connected batteries;

means responsive to the output current of said second circuit means for producing a second electrical output signal when said output current is greater than a predetermined maximum value; and second means responsive to said second electrical output signal for disabling said oscillator circuit whereby said second circuit means is also disabled when said output current thereof is greater than said predetermined maximum value.

* * * * *